United States Patent
Stettner et al.

[19]

[11] Patent Number: 6,133,989
[45] Date of Patent: *Oct. 17, 2000

[54] 3D IMAGING LASER RADAR

[75] Inventors: Roger Stettner; Howard W. Bailey, both of Santa Barbara, Calif.

[73] Assignee: Advanced Scientific Concepts, Inc., Santa Barbara, Calif.

[ * ] Notice: This patent is subject to a terminal disclaimer.

[21] Appl. No.: 08/665,738

[22] Filed: Jun. 19, 1996

Related U.S. Application Data

[63] Continuation-in-part of application No. 08/015,627, Feb. 9, 1993, Pat. No. 5,446,529.

[51] Int. Cl.$^7$ .................................................. G01C 03/08
[52] U.S. Cl. .......................................... 356/4.01; 250/332
[58] Field of Search ................................. 356/5.03, 5.04, 356/4.01; 250/332, 339.02

[56] References Cited

U.S. PATENT DOCUMENTS

| 5,220,164 | 6/1993 | Lieber et al. ...................... 250/214 VT |
| 5,243,541 | 9/1993 | Ulich ....................................... 364/516 |
| 5,446,529 | 8/1995 | Stettner et al. ......................... 356/4.01 |

*Primary Examiner*—Mark Hellner
*Attorney, Agent, or Firm*—Gottlieb, Rackman & Reisman, P.C.

[57] ABSTRACT

A three dimensional imaging device is presented which uses single pulse from a pulsed light source for detecting objects enveloped by a light-transmitting medium such as the earth's atmosphere or free space. By means of switching off a ramping voltage, individually for each object pixel, the time of arrival of the reflected pulse is recorded. This time is related to the third object dimension. The device consists of the pulsed light source, optics for collecting the reflected light, a sensor for detecting the light, drive and output electronics for timing and signal conditioning of data generated by the sensors and a computer for processing the sensor data and converting it to a three dimensional image. The sensor collects and processes the light data in a unique manner, using a hybrid. The hybrid is actually a two dimensional array of collectors or detectors combined in very close proximity with their own processing electronics. In general, the hybrid is composed of two integrated circuit chips mated together. The two dimensional array defines two dimensions of the image. The processing electronics individually and independently switch off, at high-speed, a time varying voltage when the light pulse, reflected from the object, arrives at the sensor. The final voltages are stored and can be mathematically transformed to the third object dimension. The sensor also records peak light pulse information which can be used to obtain higher resolution in the third dimension.

75 Claims, 5 Drawing Sheets

3D IMAGING LASER RADAR

This application is a continuation-in-part of application Ser. No. 08/015,627 filed Feb. 9, 1993, 3D Imaging Underwater Laser Radar (herein called Reference 1), now U.S. Pat. No. 5,446,529.

BACKGROUND OF THE INVENTION

This invention relates to a laser radar vision apparatus capable of producing a three-dimensional image of a distant target.

In particular, it relates to a lightweight, multiplexing, electronic apparatus for capturing a three-dimensional (3D) image of a distant target at high-spatial and high-range resolution in the atmosphere or in space with a single laser pulse.

Laser radars (ladars) determine range in the atmosphere by measuring the transit time of a laser pulse from the transmitter/receiver to the target and dividing by twice the velocity of light in the atmospheric medium. Range resolution in such devices is related to the accuracy of this transit time measurement. In the atmosphere, ranges are typically measured in kilometers, where range resolution can be as small as 30 cm. A 3D target image can be obtained with a laser radar by rastering the laser beam across the target and measuring the transit time, pulse by pulse, where each pulse corresponds to a point on the target. The distance between points on the target determines the spatial resolution of the rastered image and defines the picture element (pixel) size; the number of pixels at the target determines the pixel-array size; the range resolution determines resolution in the third target dimension. Rastering is a slow process, particularly for large pixel-array sizes, and it requires cumbersome mechanical scanners and complex pixel-registration computer processing.

When high-speed imaging is required, it is desirable to obtain the entire image with one laser pulse. However, because of weight, cost and complexity problems, it is undesirable to obtain the entire image with independent, parallel, laser radar receivers, where each pixel uses a separate laser radar receiver system; multiplexing with one laser radar receiver should be used to make a large pixel-array imaging system practical. Currently there are no lightweight, small-size, multiplexing laser radar receivers which can image an entire target, in the atmosphere, with a single laser pulse at large pixel-array size and high-range resolution. Reference 1, however, discloses a lightweight, multiplexing laser radar receiver which can image an entire target, in water, with a single laser pulse. It accomplishes this feat by storing the reflected signal from each range resolution interval to determine, by means of a signal amplitude comparison, the time of laser pulse returned.

Because the range of lasers in the atmosphere is 10 to 100 times the range in water, but the range resolutions are comparable, it is impractical to store the signal from the too-numerous range resolution intervals and evaluate transit time to a target. Instead the returning pulse must stop a clock. This clock can be a voltage ramp; that is a voltage which is decreasing in time. The voltage at which the ramp is switched off determines the time at which the laser pulse returned. The voltage ramp begins when the laser pulse is transmitted. Because stopping a clock or switching off a voltage ramp is usually dependent upon the returning-pulse amplitude for typical laser pulse widths (due to the clock-stopping circuitry) and the returning-pulse amplitude is dependent, pixel by pixel, on the reflectivity of the target, the range must be corrected for amplitude to obtain high range resolution.

BRIEF DESCRIPTION OF THE PRESENT INVENTION

The present invention overcomes the limitation of multiple laser radar receivers for single-pulse imaging by employing a hybrid chip design and unique integrated circuitry. The hybrid is typically composed of two chips, an array of detectors (or collectors) directly connected to an array of processing-electronics unit cells. Each detector/collector, on one chip, is connected to its own processing-electronics unit cell, on the other chip, and defines a pixel in the image. Each processing-electronics unit cell, on the array, contains an identical and unique integrated circuit which can store the reflected-pulse transit time for a target pixel as well as store amplitude information required for high-range resolution. The transit-time information for all pixels is multiplexed off the hybrid between laser pulses. Each detector/collector with its processing-electronics unit cell is equivalent to an independent laser radar receiver. Embodiments are presented where laser photons interact directly with the detector array generating a signal or where the laser photons are converted to electrons which then generate the signal.

It is the object of the present invention to provide a device for three dimensional imaging of objects by transit time measurements in transparent media and to overcome the problems of prior systems associated with the need for storing signals from multiple range resolution intervals, for mechanical scanning and for multi-pulse target coverage. The device comprises a pulsed light source, means for projecting the light towards the object, optics for collecting the reflected light, improved sensors for detecting the reflected light, drive and output electronics for timing and signal conditioning of data from the sensors and a computer and software for converting the sensor data to a three dimensional image.

It is further the object of the present invention to provide sensors which detect and store target-reflected laser-light transit-time and peak amplitude information on a processing-electronics unit cell array from which the range of each target pixel can be accurately determined.

DETAILED DESCRIPTION OF A PREFERRED EMBODIMENT OF THE INVENTION

Figure 1:
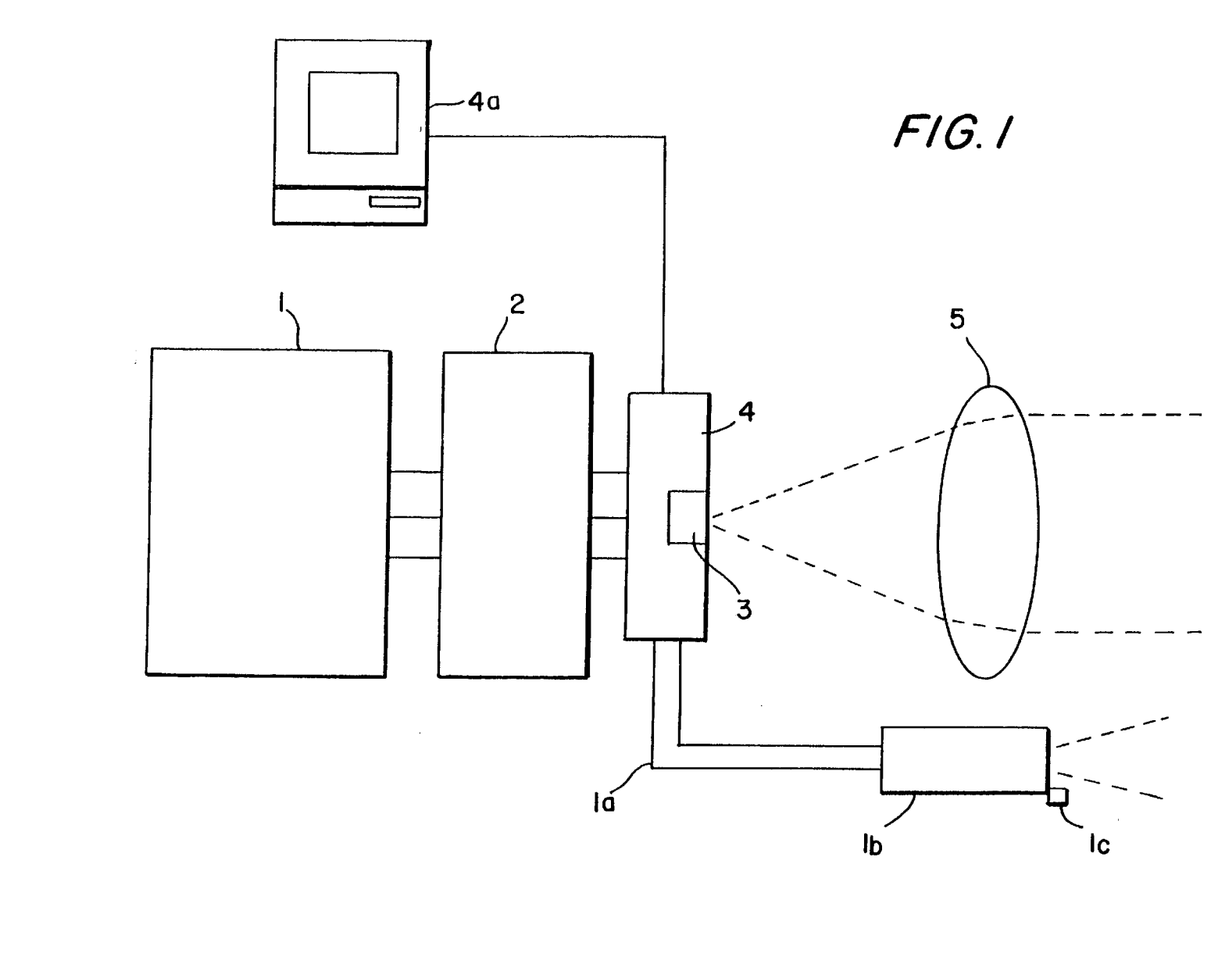
FIG. 1 is a side view of the preferred embodiment of the Laser Radar Focal Plane Array Imaging System.

A preferred embodiment of the present invention, the Laser Radar Focal Plane Array (LR-FPA) imaging system depicted in FIG. 1, is designed to produce three-dimensional image data (area and range) from a single laser pulse reflected from objects in the atmosphere, using transit time information, and process the data to form a three dimensional image. Six parts make up the preferred embodiment of the invention; a pulsed laser 1, with delivery system 1a, collimator 1 and laser transmission detector 1c the data processing and laser control system 2; the sensor 3, and associated output and drive electronics 4, and the optics 5. The output and drive electronics 4 is electrically connected to an image processing computer 4*a*.

Figure 2:
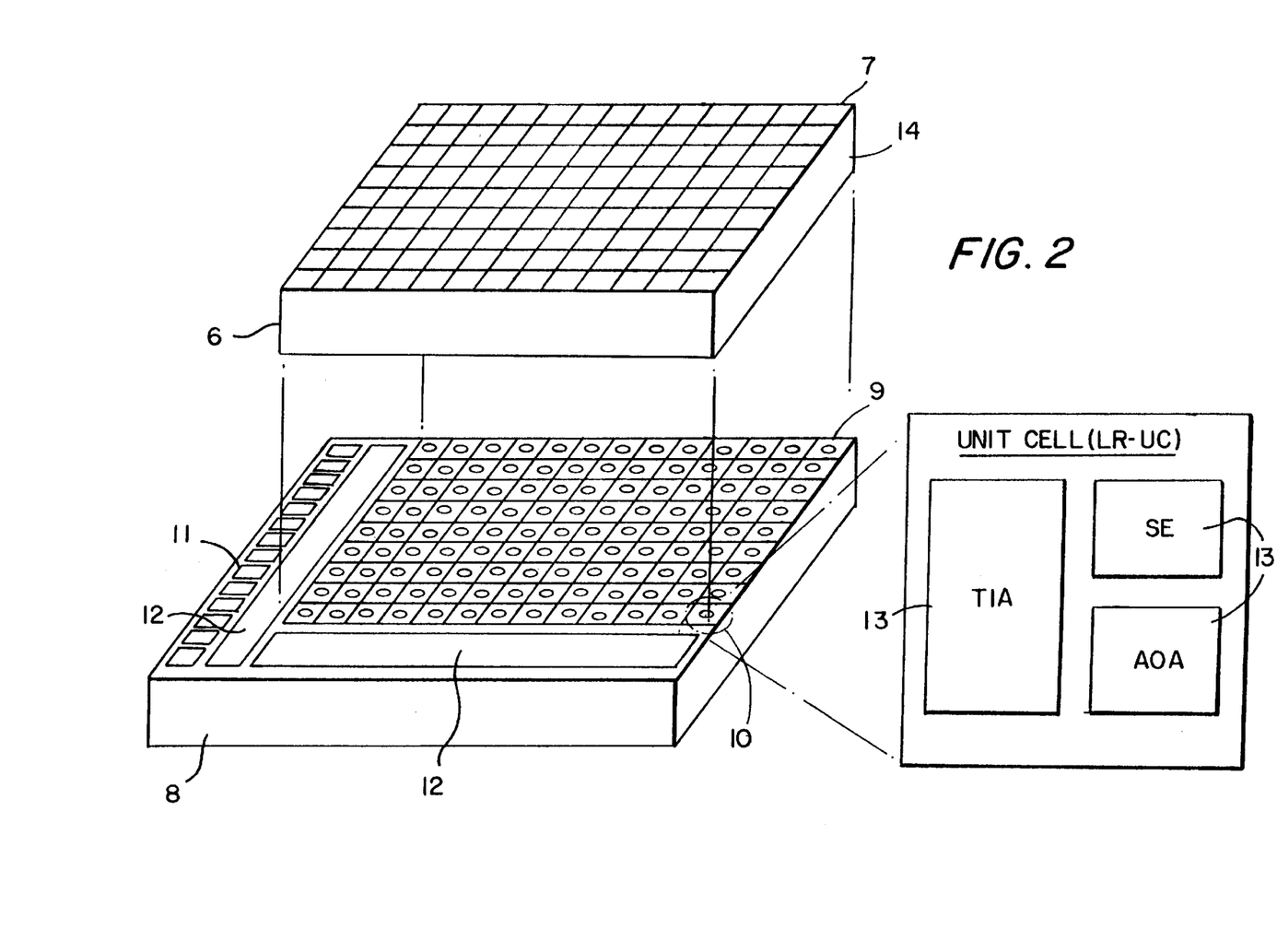
FIG. 2 is a perspective view of the hybrid sensor of the present invention.

FIG. 2 shows one sensor design 3, a hybrid sensor, in greater detail. It consists of a detector array chip 6, composed of individual detectors 7, the laser radar processor chip 8, and indium bumps 9, which electrically connect each detector 7 to a single, corresponding, laser radar processor unit cell 10. Wire bond pads 11 electrically connect the hybrid sensor 3 to the drive and output electronics 4. Multiplexing and output amplifier circuitry 12 connect the unit cell circuitry 13 with the wire bond pads 11. In the hybrid sensor 3, laser light interacts directly with the detectors which are solid state devices that are responsive to the particular laser wavelength. The detectors are made on a solid-state substrate 14. The detector size can be 10 $\mu$m to 500 $\mu$m on a side. The array size can be 4×4 to 1024×1024. Typically the chips are a few centimeters square.

For intense sources the detector array chip 6 may be combined with the laser radar processor chip 8 in a monolithic design. In this configuration a small detector 7 would be incorporated in the laser radar processor unit cell 10.

Figure 3:
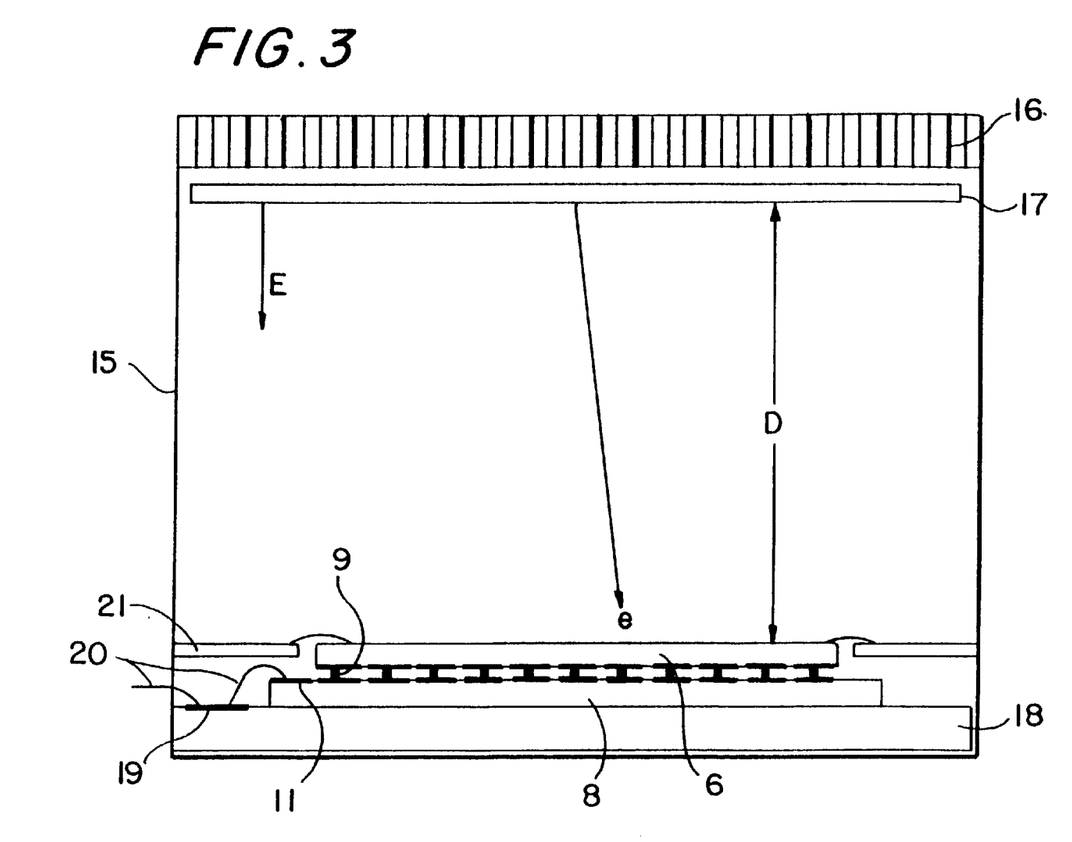
FIG. 3 is a side view of the vacuum tube sensor of the present invention.

FIG. 3 shows an alternate sensor design, the vacuum tube sensor 3, where the detector array chip 6, is bump bonded to the laser radar processor chip 8, and enclosed in a vacuum tube 15. The vacuum tube contains a fiber optic window 16 to channel the laser light to a photocathode 17, where the laser light is converted to photoelectrons. A voltage between the photocathode and the detector array generates a large electric field, E, in the tube to accelerate the electrons into the detector array 6. The laser radar processor chip 8 is mounted on a ceramic chip carrier 18 which contains wire bond pads 19 that communicate with the drive and output electronics 4 (FIG. 1) and laser radar processor chip 8 by means of wires 20. The vacuum tube 15 may also contain guard rings 21 at the same potential as the detector array. Typically the FIG. 3 sensor is few centimeters in all three dimensions.

Figure 4:
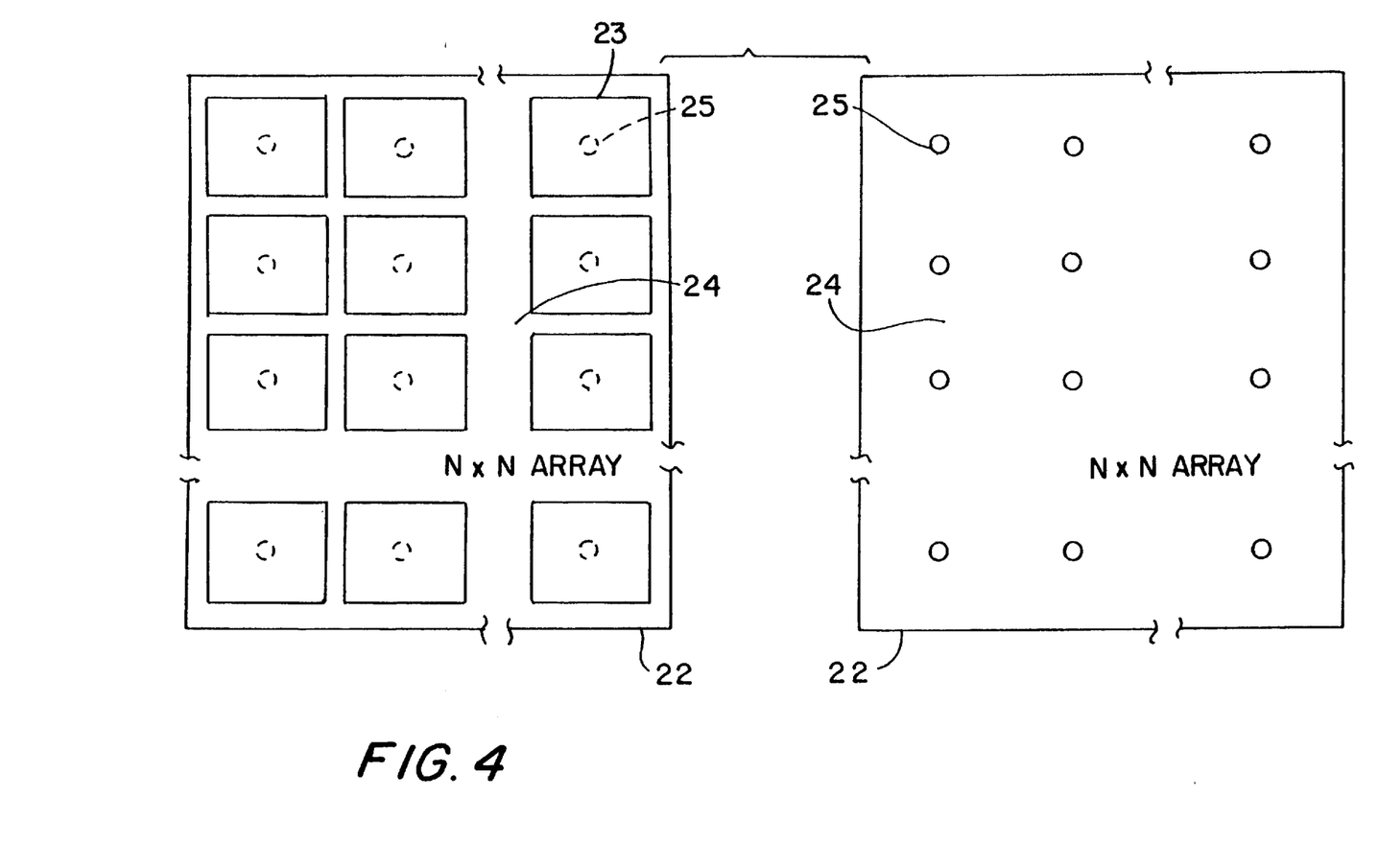
FIG. 4 is a top and side view of the anode array of the present invention.

In the FIG. 3 sensor configuration the detector array 6 can either be a solid-state detector array or an anode array. An anode array 22 is depicted in FIG. 4. The anodes 23 are metal pads on top of a ceramic substrate 24, that collect electrons and pass the electrical signal through metal vias 25 in the ceramic substrate 24 to indium bumps 9 at the underside of the anode array. Contact to the indium bump 9 is made at the metal via 25 on the bottom of the substrate 24. When the FIG. 3 sensor is used with the FIG. 4 anode array, the sensor a can also contain a microchannel plate between the photocathode 17 and the anode array 6 in an alternate design; the microchannel plate is not shown in the figure.

In an alternate sensor 3 design, the FIG. 3 sensor may be placed in a magnetic field oriented perpendicular to the photocathode 17.

Figure 5:
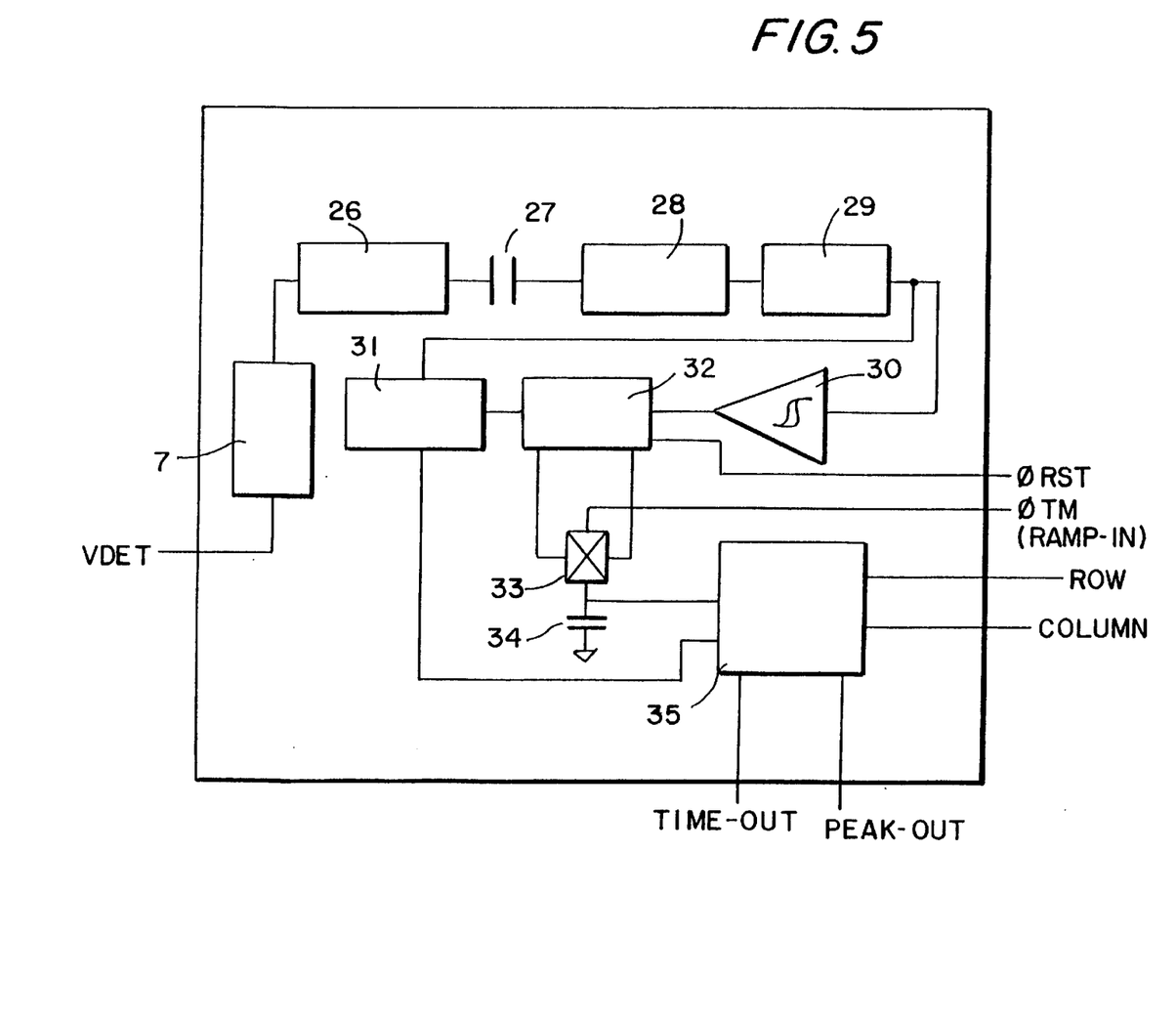
FIG. 5 is a block diagram of the unit cell processing-electronics of the present invention.

FIG. 5 shows a block diagram of the unit cell circuitry 13 (FIG. 2). The detector 7 inputs a current signal to a transimpedance amplifier 26 which is AC coupled by means of coupling capacitor 27 to a high pass filter 28 and then to an amplifier 29. The amplified voltage signal is passed on to both a Schmitt Trigger 30 and a peak detector 31. If the signal is large enough, the transit-time memory 32 will change state and open switch 33. This terminates the charging of memory capacitor 34 by the ramp voltage $\emptyset$TM. Both the peak detector 31 and the analog memory 34 are connected to the output amplifier circuitry 35. There may be a plurality of memory capacitors 34 and the means to switch between them, corresponding to multiple reflections from multiple objects.

The LR-FPA imaging system functions as follows. A pulsed laser 1 (FIG. 1) emits a laser pulse, via a delivery system 1*a* and collimator 1*b*, towards a target. A laser transmission detector 1*c* gates on the clock to start the ramp voltage $\emptyset$TM (FIG. 5) located within the output and drive electronics 4. The collimator is designed so that the laser pulse illuminates all or a large part of the target and not just one point. Laser light reflected from the target is captured by the optics 5 and focused on the sensor 3. Light absorbed by the detectors 7 (sensor in FIG. 2 only) of the detector array 6 are converted to electrons and holes and each is conducted by detector internal fields to opposite sides of the detector substrate 14. Charges that conduct to the bottom of the substrate 14 are conducted through the indium bump 9 as an electric currents to laser radar processor unit cells 10 corresponding to the detectors 7 that absorbed the laser photons.

For intense reflected signals or where the size of the laser radar processor unit cell 10 is large, a monolithic design can incorporate a small detector 7 into in the laser radar processor unit cell 10. Under these circumstances the detector current flows directly into the unit cell processing electronics much as depicted in FIG. 5.

If the FIG. 3 vacuum tube sensor 3 is employed with the LR-FPA imaging system depicted in FIG. 1 as before, laser light reflected from the target is captured by the optics 5 and focused on the sensor 3. Laser photons are channeled by the fiber optic window 16 to the photocathode 17 where the laser light is converted to photoelectrons. The photoelectrons are accelerated by the electric field, E, into the detector array 6, where the signal is amplified. Amplification results because it requires about three times the bandgap of the detector solid state material, or typically about 3 eV, to create an electron-hole pair and the potential drop between the photocathode and the detector array is many keV. Although some energy is lost in penetrating into the active area of the detectors 7, the energy that remains will create multiple electron-hole pairs for each photoelectron and hence amplification. Charges that conduct to the bottom of the substrate 14 are conducted through the indium bump 9 as an electric current to laser radar processor unit cells 10 corresponding to the detectors 7 that absorbed the laser photons.

If the FIG. 4 vacuum tube sensor 3 employs a detector array 6 which is an anode array 22 the photoelectrons are collected by the anodes, without amplification, and are conducted as electric current through the vias 25, through the indium bump 9 to laser radar processor unit cells IQ corresponding to the anodes 23 that absorbed the photoelectrons.

The FIG. 4 vacuum tube sensor 3 employing a detector array 6 which is an anode array 22 can also be used, in an alternate configuration, to amplify the photoelectrons: a microchannel plate is placed between the photocathode 17 and the anode array 22. In this case the electric field accelerates the electrons into the top of the microchannel plate tubules. A voltage across the microchannel plate causes multiplication of the photoelectrons in the microchannel plate tubule. A voltage from the bottom of the microchannel plate to the anode array 22 accelerates the electrons to the anode array 22 and these are collected by the anodes 23. The electrons collected by the anodes 23 form a detector current which is conducted through the vias 25, through the indium bump 9 to laser radar processor unit cells 10 corresponding to the anodes 23 that absorbed the amplified electrons.

All the FIG. 4 vacuum tube sensors 3 can be used in a magnetic field oriented perpendicular to the photocathode 17. The magnetic field increases the spatial resolution of the invention by preventing lateral translation of photoelectrons emitted with velocity components parallel to the photocathode. The electrons spin around a magnetic field line in their transit to the detector array 6.

The detector currents are processed by the laser radar processor unit cell circuitry 13, for all sensors 3 as follows. Detector currents are input to the oft transimpedance amplifier 26 and converted to a voltage. Because of input capacitance, the transimpedance amplifier circuitry also acts like a low pass filter only allowing input frequencies lower then or equalt to those of the laser pulse to pass through to the next processing stage. The coupling capacitor 27 removes constant current sources, such as detector dark current, from the voltage signal. The high pass filter 28 removes the lower frequency noise leaving only those frequencies associated with the laser pulse. The combination of low pass filtering, constant current filtering and high pass filtering removes most of the signal noise and improves the signal-to-noise ratio and consequently the sensitivity of the unit cell circuitry. The output of the high pass filter 28 is fed into an amplifier 29 to increase the sensitivity of the unit cell circuitry to low-amplitude laser pulses. Output of the amplifier 29 is fed directly into a Schmitt Trigger 30. The function of the Schmitt Trigger 30 is to reshape the incoming waveform into a square wave, with fast rise and fall times, after a set trigger level is reached. The Schmitt Trigger 30 provides positive feedback for saturation to occur rapidly and therefore produce sharp rise times.

The state of the transit-time memory 32 will either connect or disconnect the switch 33 from the external ramp voltage ØTM. Just prior to the emission of the laser pulse, the transit-time memory 32 is reset so the switch 33 is closed and the ramp voltage can be fed directly into the analog memory 34. The analog memory 34 is typically a capacitor that is charged by the ramp voltage. A laser pulse changes the memory state of the transit-time memory 32, via the Schmitt Trigger, and opens the switch 33 preventing further charging of the analog memory 34 by the ramp voltage. The final voltage on the analog memory 34 is directly related to the laser pulse transit time through the ramp voltage time function.

The change of state of the transit-time memory 32 not only turns the switch 33 off but also turns on the peak detector 31 which finds the maximum amplitude of the amplified laser pulse. Although the amplifier 29 is not linear throughout the range of laser-generated detector input currents, the laser pulse amplitude can be found from the measured nonlinear relationship. Thus output of the peak detector 31 can be used to find the amplitude of the laser pulse. The time at which the transit-time memory 32 changes state, relative to the beginning of a given laser pulse shape, can be measured as a function of pulse amplitude. By knowledge of this function and by knowledge of the amplitude of the laser pulse, all transit times and hence all ranges can be corrected for laser pulse amplitude. Thus range resolution is made as accurate as possible using the peak detector 31 output. The varying reflectivity of a target affects reflected pulse amplitude but not pulse shape. The pulse shape is constant for a given imaging system: FIG. 1. The peak amplitude signal is stored on an analog memory cell, typically a capacitor, in the peak detector block 21. To avoid contamination of this stored signal by unwanted reflections (reflections from the ground below a target for example) a timing generator in the peak detector block 21 disconnects the peak detector analog memory from the amplifier 29 after a predetermined time.

Alternatively, if more than one reflected signal is anticipated, for an target behind a target, for example, more than one peak detector analog memory may be present in the peak detector block 21. Correspondingly more than one transit-time memory 32 may also be present. The electrical means for switching between these memories would also be present in the laser radar processor unit cell 10 designed for multiple reflections. Typically the switching would be performed by shift register in the processing electronics unit cell circuitry 13.

After the maximum time required for laser pulse return, the drive electronics 4 begins sequencing through the laser radar processor unit cells 10, reading out the data. When both the Row and Column lines of a particular unit cell are activated, the Output Amplifier circuitry 35 switches the arrival-time voltage, TIME-OUT, and the peak-detector voltage PEAK-OUT, onto the output lines and they are driven by the output amplifier to the output and multiplexing circuitry 12, FIG. 2, which drives the signals to the output electronics 4. The arrival-time voltage and peak-detector voltage are processed by the image processing computer 4a and displayed as a 3D image. After the drive and output electronics 4 has processed the laser radar processor unit cell 8 output voltages, each unit cell memory 32 is reset by a drive-electronics 4 generated pulse, making this unit cell ready for the next laser pulse.

What is claimed is:

1. A device for imaging sections of a three dimensional objects immersed in a light conducting medium comprising:
    a pulsed light source;
    means for transmitting light from said pulsed light source into said medium;
    optics for collecting light from said medium during the time for light to transit from said pulsed light source, reflect from said objects and be collected by said optics;
    a sensor means for detecting said collected light, said sensor means comprising
    means for converting said collected light into electrical charge,
    a hybrid comprising
    multiplexing and output circuitry,
    a plurality of collection or detection means for collecting or detecting the electrical charge from said conversion means,
    a plurality of unit cell processing electronics comprising a plurality of analog memory units, each storing data related to a distinct transit time for a reflected laser pulse from an target pixel, and output amplifier electronics adapted to provide signals to output and multiplexing electronics,
    drive electronics for providing voltages and for providing timing for said output amplifier electronics and said output and multiplexing circuitry, and
    output electronics for conditioning the signals from said memory units for data processing;
    a computer for processing data from said output electronics for real time display.

2. The device for imaging sections of three dimensional objects immersed in a light conduction medium of claim 1 wherein said unit cell processing electronics, output and multiplexing electronics, and drive and output electronics is adapted to read out said data in real time between pulses from said light source.

3. The device for imaging sections of three dimensional objects immersed in a light conduction medium of claim 1 wherein said analog memory units are capacitors.

4. The device for imaging sections of three dimensional objects immersed in a light conduction medium of claim 1 wherein said conversion means is a solid state detector array.

5. The device for imaging sections of three dimensional objects immersed in a light conduction medium of claim 1 wherein said conversion means is a photocathode.

6. The device for imaging sections of three dimensional objects immersed in a light conduction medium of claim 1 wherein said conversion means and said hybrid are contained in a vacuum tube.

7. The device for imaging sections of three dimensional objects immersed in a light conduction medium of claim 1 wherein said conversion means and said hybrid are contained in a vacuum tube with a microchannel plate between them.

8. The device for imaging sections of three dimensional objects immersed in a light conduction medium of claim 7 wherein said vacuum tube is situated in a magnetic field parallel to the tube axis.

9. The device for imaging sections of three dimensional objects immersed in a light conduction medium of claim 1 wherein said collection or detection means is an anode.

10. The device for imaging sections of three dimensional objects immersed in a light conduction medium of claim 1 wherein said collection or detection means is a PIN diode.

11. The device for imaging sections of three dimensional objects immersed in a light conduction medium of claim 1 wherein said collection or detection means is a PIN diode, a plurality of which are organized into one chip which are electrically and individually connected, by connection means, to the said unit cell processing electronics, a plurality of which are organized into a separate chip.

12. The device for imaging sections of three dimensional objects immersed in a light conduction medium of claim 1 wherein said collection or detection means is a anode, a plurality of which are organized into one chip which are electrically and individually connected, by connection means, to the said unit cell processing electronics, a plurality of which are organized into a separate chip.

13. The device for imaging sections of three dimensional objects immersed in a light conduction medium of claim 11 and 12 wherein said connection means are indium bumps.

14. The three dimensional imaging device of claim 1 wherein said collection or detection means is included in the said unit cell processing electronics.

15. A sensor for detecting the presence of light, comprising means for converting said light into electrical charge, a hybrid comprising multiplexing and output circuitry, a plurality of collection or detection means for collecting or detecting the electrical charge from said conversion means, a plurality of unit cell processing electronics comprising a plurality of analog memory units, each storing data related to a distinct transit time for a reflected laser pulse from an target pixel, and output amplifier electronics adapted to provide signals to output and multiplexing electronics.

16. The sensor for detecting the presence of light of claim 15 wherein said analog memory units are capacitors.

17. The sensor for detecting the presence of light of claim 15 wherein said conversion means is a solid state detector array.

18. The sensor for detecting the presence of light of claim 15 wherein said conversion means is a photocathode.

19. The sensor for detecting the presence of light of claim 15 wherein said conversion means and said hybrid are contained in a vacuum tube.

20. The sensor for detecting the presence of light of claim 15 wherein said conversion means and said hybrid are contained in a vacuum tube with a microchannel plate between them.

21. The sensor for detecting the presence of light of claim 19 wherein said vacuum tube is situated in a magnetic field parallel to the tube axis.

22. The sensor for detecting the presence of light of claim 15 wherein said collection or detection means is an anode.

23. The sensor for detecting the presence of light of claim 15 wherein said collection or detection means is a PIN diode.

24. The sensor for detecting the presence of light of claim 15 wherein said collection or detection means is a PIN diode, a plurality of which are organized into one chip which are electrically and individually connected, by connection means, to the said unit cell processing electronics, a plurality of which are organized into a separate chip.

25. The sensor for detecting the presence of light of claim 15 wherein said collection or detection means is a anode, a plurality of which are organized into one chip which are electrically and individually connected, by connection means, to the said unit cell processing electronics, a plurality of which are organized into a separate chip.

26. The sensor for detecting the presence of light of claim 24 and 25 wherein said connection means are indium bumps.

27. The sensor for detecting the presence of light of claim 15 wherein said collection or detection means is included in the said unit cell processing electronics.

28. The three dimensional imaging device of claim 1 wherein the said unit cell processing electronics includes transimpedance amplifier means.

29. The three dimensional imaging device of claim 1 wherein the said unit cell processing electronics includes amplifier means.

30. The three dimensional imaging device of claim 1 wherein the said unit cell processing electronics includes filtering means.

31. The three dimensional imaging device of claim 1 wherein the said unit cell processing electronics includes Peak Detector electronics.

32. The three dimensional imaging device of claim 1 wherein the said unit cell processing electronics contains Schmitt Trigger and Memory means.

33. The three dimensional imaging device of claim 28 having an amplifier means wherein the said transimpedance amplifier means and said amplifier means are capacitively coupled to each other.

34. The three dimensional imaging device of claim 28 having an amplifier means wherein the said transimpedance amplifier means and said amplifier means are connected by a high frequency filter.

35. The three dimensional imaging device of claim 32 having an amplifier means wherein the said amplifier means is connected to the said Schmitt Trigger and Memory means by a high frequency filter.

36. The three dimensional imaging device of claim 31 wherein, the said Peak Detector electronics includes capacitors for analog storage of electrical signals related to the peak laser return signals.

37. The three dimensional imaging device of claim 31 wherein the said peak detector electronics includes a timing generator for turning the peak detector on and off.

38. The sensor for detecting the presence of light of claim 15 wherein the said unit cell processing electronics includes transimpedance amplifier means.

39. The sensor for detecting the presence of light of claim 15 wherein the said unit cell processing electronics includes amplifier means.

40. The sensor for detecting the presence of light of claim 15 wherein the said unit cell processing electronics includes filtering means.

41. The sensor for detecting the presence of light of claim 15 wherein the said unit cell processing electronics includes Peak Detector electronics.

42. The sensor for detecting the presence of light of claim 15 wherein the said unit cell processing electronics contains Schmitt Trigger and Memory means.

43. The sensor for detecting the presence of light of claim 38 having amplifier means wherein the said transimpedance amplifier means and said amplifier means are capacitively coupled to each other.

44. The sensor for detecting the presence of light of claim 38 having amplifier means wherein the said transimpedance amplifier means and said amplifier means are connected by a high frequency filter.

45. The sensor for detecting the presence of light of claim 42 having amplifier means wherein the said amplifier means is connected to the said Schmitt Trigger and Memory means by a high frequency filter.

46. The sensor for detecting the presence of light of claim 41 wherein the said Peak Detector electronics includes capacitors for analog storage of electrical signals related to the peak laser return signals.

47. The sensor for detecting the presence of light of claim 41 wherein the said peak detector electronics includes a timing generator for turning the peak detector on and off.

48. The sensor for detecting the presence of light of claim 15 having amplifier means wherein the said output amplifier means includes column and row selection switching means for each output.

49. A method for imaging sections of three dimensional objects immersed in a light conducting medium comprising the steps of:
generating a series of pulses of light;
transmitting said light into said medium;
collecting light from said medium during the time of transmission and reflection of light from said objects;
detecting said collected light
providing electrical signals from a plurality of positions on the objects with a single light pulse,
storing said electrical signals on a plurality of unit cells corresponding to the said plurality of positions on said objects,
providing signals from said storage means,
converting the signals stored on said storage means to a three-dimensional image of the objects.

50. The method for imaging sections of three dimensional objects immersed in a light conducting medium of method 49 wherein the electrical signals correspond to the transit time of the light to the object positions and back to the transmitter.

51. The method for imaging sections of three dimensional objects immersed in a light conducting medium of method 49 wherein the electrical signals include those corresponding to the peak of the reflected light pulse.

52. The method for imaging sections of three dimensional objects immersed in a light conducting medium of method 50 wherein the electrical signals include those corresponding to the peak of the reflected light pulse.

53. The device for imaging sections of three dimensional objects immersed in a light conduction medium of claim 4 wherein said solid state detector array amplifies the signal.

54. The sensor of claim 17 for detecting the presence of light wherein the said solid state detector array amplifies the signal.

55. The device for imaging sections of three dimensional objects immersed in a light conduction medium of claim 1 wherein the peak of the light pulse is output as an electrical signal for each of the said collection means.

56. The sensor for detecting the presence of light of claim 15 wherein the peak of he light pulse is output as an electrical signal for each of the said collection means.

57. The device for imaging sections of three dimensional objects immersed in a light conduction medium of claim 1 wherein each said distinct transit time is obtained by means of disconnection from a ramp voltage.

58. The sensor for detecting the presence of light of claim. 15 wherein each said distinct transit time is obtained by means of disconnection from a ramp voltage.

59. The device for imaging sections of three dimensional objects immersed in a light conduction medium of claim 55 wherein a peak detector obtains the peak of the light pulse.

60. The sensor for detecting the presence of light of claim 56 wherein a peak detector obtains the peak of the light pulse.

61. The device for imaging sections of three dimensional objects immersed in a light conduction medium of claim 57 wherein a Schmitt Trigger causes the said disconnection form the ramp voltage.

62. The sensor for detecting the presence of light of claim 58 wherein a Schmitt Trigger causes the said disconnection form the ramp voltage.

63. The device for imaging sections of three dimensional objects immersed in a light conduction medium of claim 1, wherein said unit cell processing electronics includes amplifiers.

64. The sensor for detecting the presence of light of claim 15 wherein the said unit cell processing electronics includes amplifiers.

65. The device for imaging sections of three dimensional objects immersed in a light conduction medium of claim 1 wherein the said unit cell processing electronics includes filters.

66. The sensor for detecting the presence of light of claim 15 wherein the said unit cell processing electronics includes amplifiers.

67. The device for imaging sections of three dimensional objects immersed in a light conduction medium of claim 55 wherein the said electrical signal is first stored in an analog memory unit before being output.

68. The sensor for detecting the presence of light of claim 56 wherein the said electrical signal is first stored in an analog memory unit before being output.

69. The device for imaging sections of three dimensional objects immersed in a light conduction medium of claim 67 wherein the said analog memory unit is a capacitor.

70. The sensor for detecting the presence of light of claim 68 wherein the said analog memory unit is a capacitor.

71. The sensor for detecting the presence of light of claim 58 wherein the value of the said ramp voltage at disconnection is stored on an analog memory unit before being output.

72. The device for imaging sections of three dimensional objects immersed in a light conduction medium of claim 57 wherein the value of the said ramp voltage at disconnection is stored on an analog memory unit before being output.

73. The sensor for detecting the presence of light of claim 71 wherein the said analog memory unit is a capacitor.

74. The device for imaging sections of three dimensional objects immersed in a light conduction medium of claim 72, wherein the said analog memory unit is a capacitor.

75. The sensor for detecting the presence of light of claim 15 wherein the said unit cell processing electronics includes a timing generator to prevent contamination of the peak signals from unwanted reflections.

* * * * *